United States Patent
Kitazawa

(10) Patent No.: US 11,028,234 B2
(45) Date of Patent: Jun. 8, 2021

(54) ADDITION-CURABLE SILICONE COMPOSITION

(71) Applicant: Shin-Etsu Chemical Co., Ltd., Tokyo (JP)

(72) Inventor: Keita Kitazawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/498,222

(22) PCT Filed: Mar. 19, 2018

(86) PCT No.: PCT/JP2018/010799
§ 371 (c)(1),
(2) Date: Sep. 26, 2019

(87) PCT Pub. No.: WO2018/180704
PCT Pub. Date: Oct. 4, 2018

(65) Prior Publication Data
US 2020/0032000 A1    Jan. 30, 2020

(30) Foreign Application Priority Data
Mar. 27, 2017 (JP) .............................. JP2017-060675

(51) Int. Cl.
*C08G 77/50* (2006.01)
*C08K 3/36* (2006.01)

(52) U.S. Cl.
CPC .............. *C08G 77/50* (2013.01); *C08K 3/36* (2013.01)

(58) Field of Classification Search
None
See application file for complete search history.

(56) References Cited

U.S. PATENT DOCUMENTS

| | | | |
|---|---|---|---|
| 4,784,879 A | 11/1988 | Lee et al. | |
| 5,017,654 A | 5/1991 | Togashi et al. | |
| 5,877,237 A | 3/1999 | Nakanishi et al. | |
| 2008/0254077 A1* | 10/2008 | Prigent | A61Q 19/00 424/401 |
| 2011/0158923 A1* | 6/2011 | Galeone | B01J 13/18 424/59 |
| 2011/0236498 A1* | 9/2011 | Marteaux | B01J 13/18 424/497 |
| 2017/0073518 A1 | 3/2017 | Morita et al. | |
| 2017/0130108 A1* | 5/2017 | Bradford | H01L 23/296 |

FOREIGN PATENT DOCUMENTS

| | | |
|---|---|---|
| JP | 64-47442 A | 2/1989 |
| JP | 2-14244 A | 1/1990 |
| JP | 4-46962 A | 2/1992 |
| JP | 4-59873 A | 2/1992 |
| JP | 7-196921 A | 8/1995 |
| JP | 2002-12768 A | 1/2002 |
| WO | WO 2016/052521 A2 | 4/2016 |
| WO | WO-2016133946 A1 * | 8/2016 .............. B01J 33/00 |

OTHER PUBLICATIONS

International Search Report (PCT/ISA/210) issued in PCT/JP2018/010799, dated Jun. 26, 2018.
Written Opinion of the International Searching Authority (PCT/ISA/237) issued in PCT/JP2018/010799, dated Jun. 26, 2018.
Extended European Search Report for European Application No. 18775954.3, dated Dec. 9, 2020.

* cited by examiner

*Primary Examiner* — Robert S Loewe
(74) *Attorney, Agent, or Firm* — Birch, Stewart, Kolasch & Birch, LLP

(57) ABSTRACT

This addition-curable silicone composition contains (A) an organopolysiloxane having at least two unsaturated aliphatic hydrocarbon groups in each molecule, (B) an organohydrogenpolysiloxane in an amount that provides a value of 0.5-5 for the ratio of the number of SiH groups to the total number of unsaturated aliphatic hydrocarbon groups in the component (A), and (C) an effective amount of hydrosilylation catalyst microparticles that have a microcapsule structure containing a platinum-group metal catalyst-containing organic compound or polymer compound as a core material and a three-dimensional crosslinked polymer compound obtained by polymerizing at least one polyfunctional monomer as a wall material, the platinum-group metal catalyst-containing organic compound or polymer compound having a dynamic viscosity of 10-100,000 $mm^2/s$ at 25° C.

4 Claims, No Drawings

ADDITION-CURABLE SILICONE COMPOSITION

TECHNICAL FIELD

This invention relates to an addition curable silicone composition. More particularly, it relates to an addition curable silicone composition which has good long-term storage stability at room temperature and may be rapidly cured on heating.

BACKGROUND ART

Since addition curable silicone compositions cure into silicone gels, silicone rubbers, and hard coatings having excellent electrical properties, freeze resistance, heat resistance, and chemical stability, they are widely used as encapsulants, fillers, and coating agents for electrical and electronic components and semiconductor chips, and insulating/covering/protecting agents for photosemiconductor devices. Also, the compositions may be increased in strength or endowed with heat resistance by adding various inorganic fillers. Furthermore, these compositions are used as heat-dissipating materials or electroconductive materials for electronic components such as semiconductor chips and LED substrates.

Generally, the addition curable silicone compositions are broadly classified into compositions of one-pack type wherein all ingredients are premixed and compositions of two-pack type wherein one pack containing a curing catalyst and another pack containing a crosslinking agent are separately stored and mixed just before application. The one-pack addition curable silicone compositions generally lack long-term storage stability at room temperature and must be stored in frozen or refrigerated conditions, which may lead to difficulty of product management. One exemplary means for insuring the room temperature storage stability of one-pack addition curable silicone compositions is blending of an addition cure reaction inhibitor such as an acetylene alcohol (Patent Document 1: JP-A H04-46962). Although the use of an addition cure reaction inhibitor improves room temperature storage stability, the presence thereof raises the problem of retarded heat curing. The composition may encounter some troubles when used in various applications. For example, it is known that where a hydroxyl group source such as alcohol or water is added to a composition, from which a foam is obtained in a heating line, a small amount of bubbles due to dehydrogenation at the initial stage of reaction serve as nuclei, whereby a foam of quality is produced. However, the addition cure reaction inhibitor inhibits the initial foaming as well, failing to produce a foam of quality. In addition, when the composition is used as addition curable material of millable type and vulcanized at a high speed so as to mold electrical wires, tubings or the like, there arise problems, for example, the surface remains tacky and a molded part having a smooth surface cannot be obtained.

The two-pack addition curable silicone composition has excellent long-term storage stability at room temperature because one pack containing a curing catalyst and another pack containing a crosslinking agent are separated. However, there is a need for a unit of mixing the two packs and dispensing the mixture, which may become an obstacle. In addition, once the two packs are mixed, the mixture should be handled in the same manner as the above-mentioned one-pack addition curable silicone composition. There arises a problem that the mixture will cure in the production line if it is held therein for a certain time.

PRIOR ART DOCUMENTS

Patent Documents

Patent Document 1: JP-A H04-46962

SUMMARY OF INVENTION

Technical Problem

As discussed above, it is very difficult for an addition curable silicone composition to meet both "excellent long-term storage stability at room temperature" and "rapid curing on heating," independent of whether the composition is of one pack or two pack type.

An object of the invention, which has been made under the above-mentioned circumstances, is to provide an addition curable silicone composition which has excellent long-term storage stability at room temperature even in the absence of an addition cure reaction inhibitor and maintains rapid heat curing performance.

Solution to Problem

Making extensive investigations to attain the above object, the inventors have found that in connection with an addition curable silicone composition comprising an organopolysiloxane having an aliphatic unsaturated hydrocarbon group, an organohydrogenpolysiloxane, and a hydrosilylation catalyst such as platinum group metal catalyst, the outstanding problems can be solved by using a microparticulate hydrosilylation catalyst of microcapsule structure consisting of a core material of an organic compound or polymer containing a platinum group metal catalyst and a shell material of a three-dimensional crosslinked polymer obtained by polymerizing at least one polyfunctional monomer, the organic compound or polymer containing a platinum group metal catalyst having a kinematic viscosity of 10 to 100,000 mm$^2$/s at 25° C. The present invention is predicated on this finding.

The invention provides an addition curable silicone composition as defined below.

[1] An addition curable silicone composition comprising:

(A) an organopolysiloxane containing at least two aliphatic unsaturated hydrocarbon groups per molecule and having a kinematic viscosity of 60 to 100,000 mm$^2$/s at 25° C., (B) an organohydrogenpolysiloxane having at least two silicon-bonded hydrogen atoms (i.e., Si—H groups) per molecule, in such an amount that a ratio of the number of Si—H groups to the total number of aliphatic unsaturated hydrocarbon groups in component (A) ranges from 0.5 to 5, and (C) an effective amount of a microparticulate hydrosilylation catalyst of microcapsule structure consisting of a core material of an organic compound or polymer containing a platinum group metal catalyst and a shell material of a three-dimensional crosslinked polymer obtained by polymerizing at least one polyfunctional monomer, the organic compound or polymer containing a platinum group metal catalyst having a kinematic viscosity of 10 to 100,000 mm$^2$/s at 25° C.

[2] The addition curable silicone composition of [1] wherein component (C) has an average particle size of 0.01 to 1,000 μm.
[3] The addition curable silicone composition of [1] or [2] wherein the polyfunctional monomer is a polyfunctional monomer having at least two polymerizable carbon-carbon double bonds per molecule.
[4] The addition curable silicone composition of [3] wherein the polyfunctional monomer is a polyfunctional monomer having at least two (meth)acrylic groups per molecule.
[5] The addition curable silicone composition of any one of [1] to [4], further comprising (D) at least one inorganic filler selected from the group consisting of metals, metal oxides, metal hydroxides, metal nitrides, metal carbides, and carbon allotropes, in an amount of 0.1 to 5,000 parts by weight per 100 parts by weight of component (A).

Advantageous Effects of Invention

By virtue of a microparticulate hydrosilylation catalyst of specific microcapsule structure, the addition curable silicone composition of the invention has excellent long-term storage stability at room temperature even in the absence of an addition cure reaction inhibitor and maintains rapid heat curing performance.

DESCRIPTION OF EMBODIMENTS

Now the invention is described in detail.
[Component (A)]
Component (A) is an organopolysiloxane containing at least 2, preferably 2 to 100, and more preferably 2 to 50 aliphatic unsaturated hydrocarbon groups per molecule and having a kinematic viscosity of 60 to 100,000 mm$^2$/s at 25° C.

The silicon-bonded aliphatic unsaturated hydrocarbon group is a monovalent hydrocarbon group of preferably 2 to 8 carbon atoms, and more preferably 2 to 6 carbon atoms, having an aliphatic unsaturated bond, and is even more preferably an alkenyl group. Examples include alkenyl groups such as vinyl, allyl, propenyl, isopropenyl, butenyl, hexenyl, cyclohexenyl, and octenyl. Inter alia, vinyl is most preferred. The aliphatic unsaturated hydrocarbon group may be bonded to the silicon atom at the end of the molecular chain or a silicon atom at an intermediate position of the molecular chain or both.

The organopolysiloxane has silicon-bonded organic groups other than the aliphatic unsaturated hydrocarbon group, which include substituted or unsubstituted monovalent hydrocarbon groups having 1 to 18 carbon atoms, preferably 1 to 10 carbon atoms, and even more preferably 1 to 8 carbon atoms. Examples include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl, and naphthyl; aralkyl groups such as benzyl, phenylethyl, and phenylpropyl; and substituted forms of the foregoing groups in which some or all of the hydrogen atoms are substituted by halogen atoms such as fluorine, bromine or chlorine, cyano or the like, for example, chloromethyl, chloropropyl, bromoethyl, trifluoropropyl, and cyanoethyl. Inter alia, methyl is most preferred.

The organopolysiloxane has a kinematic viscosity at 25° C. of 60 to 100,000 mm$^2$/s, preferably 100 to 30,000 mm$^2$/s. If the kinematic viscosity is less than 60 mm$^2$/s, the silicone composition may have degraded physical properties. If the viscosity exceeds 100,000 mm$^2$/s, the silicone composition may lack extensibility. As used herein, the kinematic viscosity is measured at 25° C. by an Ubbelohde-Ostwald viscometer.

The molecular structure of the organopolysiloxane is not particularly limited as long as it has the above-defined properties, and may be a linear structure, a branched structure, or a linear structure having partial branched or cyclic structure. Inter alia, an organopolysiloxane of linear structure which has a backbone consisting of repeating diorganosiloxane units and is capped with triorganosiloxy groups at both ends of the molecular chain is preferred. The organopolysiloxane of linear structure may have, in part, a branched or cyclic structure. The organopolysiloxane as component (A) may be used alone or in combination of two or more.

[Component (B)]
Component (B) is an organohydrogenpolysiloxane having at least 2, preferably at least 3, more preferably 3 to 100, and even more preferably 3 to 20 silicon-bonded hydrogen atoms (i.e., Si—H groups) per molecule. Any organohydrogenpolysiloxane may be used as long as the Si—H groups on the molecule undergo addition reaction with aliphatic unsaturated hydrocarbon groups in component (A) in the presence of a platinum group metal catalyst to form a crosslinked structure.

The organohydrogenpolysiloxane has a silicon-bonded organic group, examples of which include monovalent hydrocarbon groups other than aliphatic unsaturated hydrocarbon groups. Suitable monovalent hydrocarbon groups include substituted or unsubstituted monovalent hydrocarbon groups of 1 to 12 carbon atoms, preferably 1 to 10 carbon atoms. Examples include alkyl groups such as methyl, ethyl, propyl, butyl, hexyl, and dodecyl; aryl groups such as phenyl; aralkyl groups such as 2-phenylethyl and 2-phenylpropyl; substituted forms of the foregoing groups in which some or all of the hydrogen atoms are substituted by halogen atoms such as fluorine, bromine or chlorine, cyano or the like, for example, chloromethyl, chloropropyl, bromoethyl, trifluoropropyl, and cyanoethyl; and epoxy ring-containing organic groups, specifically glycidyl groups or glycidyloxy-substituted alkyl groups such as 2-glycidoxyethyl, 3-glycidoxypropyl, and 4-glycidoxybutyl.

The molecular structure of the organohydrogenpolysiloxane is not particularly limited as long as it has the above-defined properties, and may be a linear structure, branched structure, cyclic structure, or linear structure having partial branched or cyclic structure. Inter alia, the linear and cyclic structures are preferred.

The organohydrogenpolysiloxane preferably has a kinematic viscosity at 25° C. of 1.0 to 1,000 mm$^2$/s, and more preferably 10 to 100 mm$^2$/s. When the kinematic viscosity is at least 1.0 mm$^2$/s, the silicone composition may not be degraded in physical properties. When the kinematic viscosity is up to 1,000 mm$^2$/s, the silicone composition may not lose extensibility. The organohydrogenpolysiloxane may be used alone or in combination of two or more.

The organohydrogenpolysiloxane as component (B) is added in such an amount that a ratio of the number of Si—H groups to the total number of aliphatic unsaturated hydrocarbon groups in component (A) ranges from 0.5 to 5, preferably from 0.8 to 3, and more preferably from 1 to 2.5. If the amount of component (B) is less than the lower limit, addition reaction does not fully proceed and crosslinking is short. If the amount of component (B) exceeds the upper limit, the crosslinked structure becomes non-uniform or the composition suffers a significant loss of storage stability.

[Component (C)]

Component (C) is a microparticulate hydrosilylation catalyst of microcapsule structure consisting of a core material of an organic compound or polymer containing a platinum group metal catalyst and a shell material of a three-dimensional crosslinked polymer obtained by polymerizing at least one polyfunctional monomer, the organic compound or polymer containing a platinum group metal catalyst having a kinematic viscosity of 10 to 100,000 mm$^2$/s at 25° C., which may be used in single type or in combination of two or more types. The structure of the catalyst ensures that an addition curable silicone composition loaded with the catalyst has excellent long-term storage stability at room temperature even in the absence of a reaction inhibitor and maintains rapid curing. In order to exert these effects more, the catalyst should preferably be structured so as to prevent or decelerate the diffusion of the core material in the microcapsule structure into the composition at room temperature.

The platinum group metal catalyst may be any of prior art well-known catalysts which are used in addition reaction. Examples include platinum, palladium, rhodium, ruthenium, osmium, and iridium-based catalysts. Inter alia, platinum or platinum compounds are preferred since they are relatively readily available. Illustrative examples include elementary platinum, platinum black, chloroplatinic acid, platinum-olefin complexes, platinum-alcohol complexes, and platinum coordination compounds, which may be used alone or in combination of two or more.

The platinum group metal catalyst is preferably diluted with an organic compound or polymer. Examples of the organic compound include hydrocarbons such as liquid paraffins and various mineral oils, polyhydric alcohols such as ethylene glycol and glycerol, and cyclic siloxane compounds. Examples of the polymer include hydrocarbon polymers such as polybutadiene, polyisoprene, and polyisobutylene, various liquid organopolysiloxane compounds of dimethyl, methyl-phenyl, fluoro and other types, such as dimethylpolysiloxane, and polyethers such as polyethylene glycol and polypropylene glycol, which may be used alone or in combination of two or more.

The organic compound or polymer containing the platinum group metal catalyst has a kinematic viscosity at 25° C. of 10 to 100,000 mm$^2$/s, preferably 30 to 50,000 mm$^2$/s, and more preferably 100 to 30,000 mm$^2$/s. If the kinematic viscosity is less than 10 mm$^2$/s, there is a risk that the core material in the microcapsule structure rapidly diffuses into the composition at room temperature to exacerbate its long-term storage stability. If the kinematic viscosity exceeds 100,000 mm$^2$/s, there is a risk that the core material in the microcapsule structure hardly diffuses into the composition even on heating, which may lead to a loss of cure and a non-uniform curing reaction, as demonstrated by a drop of cure speed and local curing reaction. The kinematic viscosity at 25° C. of the organic compound or polymer containing the platinum group metal catalyst is equal to the kinematic viscosity at 25° C. of the organic compound or polymer itself. Notably the kinematic viscosity is measured at 25° C. by an Ubbelohde-Ostwald viscometer.

While the polyfunctional monomer which is a precursor to the three-dimensional crosslinked polymer of which the shell material of the microcapsule structure is made may be any of prior art well-known monomers, a polyfunctional monomer having at least two polymerizable carbon-carbon double bonds per molecule is preferred. Examples include polyfunctional acrylates such as 1,6-hexanediol diacrylate, 1,10-decanediol diacrylate, trimethylolpropane triacrylate, pentaerythritol tetraacrylate, and di(trimethylolpropane) tetraacrylate; polyfunctional methacrylates such as 1,4-butanediol dimethacrylate, 1,6-hexanediol dimethacrylate, ethylene glycol dimethacrylate, diethylene glycol dimethacrylate, triethylene glycol dimethacrylate, glycerol dimethacrylate, and trimethylolpropane trimethacrylate; polyfunctional acrylamides such as N,N'-methylenebisacrylamide, N,N'-ethylenebisacrylamide, and N,N'-(1,2-dihydroxyethylene) bisacrylamide; polyfunctional methacrylamides such as N,N'-methylenebismethacrylamide; and divinylbenzene. Inter alia, polyfunctional monomers having at least two (meth)acrylic groups per molecule are preferred, and polyfunctional acrylates and methacrylates are more preferred since they are relatively readily available and fully polymerizable. These polyfunctional monomers may be used alone or in combination of two or more. As used herein, (meth)acrylic groups refer to acrylic and methacrylic groups.

The method for preparing the microparticulate hydrosilylation catalyst consisting of an organic compound or polymer containing a platinum group metal catalyst as the core material and a three-dimensional crosslinked polymer as the shell material is not particularly limited. Any prior art well-known methods may be employed. Exemplary methods include interfacial polymerization and in-situ polymerization. The polymerization reaction may be accelerated by heating or ultraviolet irradiation, optionally in combination with a thermal polymerization initiator or photopolymerization initiator.

One exemplary method for preparing the microparticulate hydrosilylation catalyst of the invention is described below.

First, a dispersion is prepared by dispersing a mixture of an organic compound or polymer containing a platinum group metal catalyst, a polyfunctional monomer, and a photopolymerization initiator in a dispersing medium. Examples of the photopolymerization initiator include diphenyl(2,4,6-trimethylbenzoyl)phosphine oxide, phenylbis(2,4,6-trimethylbenzoyl)phosphine oxide, 2-hydroxy-2-phenylacetophenone, 2,2-dimethoxy-2-phenylacetophenone, 1-hydroxycyclohexyl phenyl ketone, and 2-benzyl-2-(dimethylamino)-4'-morpholinobutyrophenone. Examples of the dispersing medium include water and a mixture of water and a water-soluble organic solvent such as methanol or ethanol. The dispersing medium may contain any dispersant, for example, alkyl sulfuric sulfonates, alkylbenzene sulfonates, alkyl sulfuric triethanolamines, polyoxyethylene alkyl ethers, or polyvinyl alcohols.

In the next step, the above-prepared dispersion is irradiated with ultraviolet radiation for polymerizing the polyfunctional monomer to form a three-dimensional crosslinked polymer as a shell material, obtaining a microparticulate hydrosilylation catalyst of microcapsule structure.

The microparticulate hydrosilylation catalyst of microcapsule structure as component (C) preferably contains 0.01 to 10% by weight, more preferably 0.05 to 5% by weight, and even more preferably 0.1 to 3% by weight of the platinum group metal catalyst in its structure. Notably the platinum atom content may be measured by ICP-OES spectrometer (Agilent 730, by Agilent Technologies).

The content of the organic compound or polymer in the microparticulate hydrosilylation catalyst is preferably 1 to 80% by weight, more preferably 3 to 70% by weight, and even more preferably 5 to 50% by weight.

The content of the three-dimensional crosslinked polymer, which is obtained from polymerization of at least one polyfunctional monomer, in the microparticulate hydrosilylation catalyst as component (C) is preferably 10 to 95% by weight, more preferably 20 to 90% by weight, and even more preferably 30 to 80% by weight.

These contents may be measured by a thermogravimetry/differential thermal analyzer (TG/DTA 7200 by SII Nano-Technology Inc.).

Component (C) preferably has an average particle size in the range from 0.01 to 1,000 μm, more preferably from 0.05 to 500 μm, and even more preferably from 0.1 to 100 μm. If the average particle size is less than 0.01 μm, the hydrosilylation catalyst microparticles are likely to agglomerate together and may be less dispersible in the addition curable silicone composition. If the average particle size exceeds 1,000 μm, the platinum group metal catalyst may become less dispersible when the addition curable silicone composition is heat cured, making it difficult to cure the composition uniformly. The average particle size may be determined as, for example, the weight-average value (or median diameter) in particle size distribution measurement by the laser diffraction method.

The microparticulate hydrosilylation catalyst as component (C) may be used alone or in combination of two or more. The amount of component (C) added may be a catalytic amount, that is, an effective amount which is necessary to promote addition reaction and to cure the addition curable silicone composition. Specifically, the amount is preferably 0.1 to 500 ppm, and more preferably 1 to 200 ppm of platinum group metal atoms based on the weight of component (A). If the catalyst amount is below the lower limit, no catalytic effect may be available. An amount in excess of the upper limit is uneconomical and undesirable because the catalytic effect is no more enhanced.

[Component (D)]

The addition curable silicone composition of the invention may further comprise an inorganic filler as component (D). The inorganic filler as component (D) is effective for imparting various properties such as heat conductivity, heat resistance, reinforcement, and electroconductivity to the addition curable silicone composition. The inorganic filler is preferably composed of at least one material selected from the group consisting of metals, metal oxides, metal hydroxides, metal nitrides, metal carbides, and carbon allotropes. Illustrative examples include aluminum, silver, copper, metallic silicon, alumina, zinc oxide, magnesium oxide, silicon dioxide, cerium oxide, iron oxide, aluminum hydroxide, cerium hydroxide, aluminum nitride, boron nitride, silicon carbide, diamond, graphite, carbon nanotubes, and graphene. The use of aluminum, alumina, zinc oxide, and boron nitride is preferred for imparting heat conductivity to the composition, the use of cerium oxide, cerium hydroxide, and iron oxide is preferred for imparting heat resistance, the use of silicon dioxide such as hydrophobic fumed silica is preferred for reinforcement, and the use of silver and copper is preferred for imparting electroconductivity.

If the inorganic filler has an average particle size in excess of 500 μm, the resulting composition may become non-uniform. Therefore, the average particle size is preferably in a range of up to 500 μm, more preferably in a range of up to 100 μm, and even more preferably in a range of up to 40 μm. In addition, the average particle size is preferably at least 0.01 μm, and more preferably at least 0.1 μm. The average particle size may be determined as, for example, the weight-average value (or median diameter) in particle size distribution measurement by the laser diffraction method. The shape of inorganic filler is not particularly limited, and may be, for example, spherical, irregular, needle-like, and plate-like.

If the amount of component (D) added is more than 5,000 parts by weight per 100 parts by weight of component (A), the composition may have a high viscosity and become difficult to handle, and sometimes become non-uniform. Therefore, the amount is preferably in a range of up to 5,000 parts by weight, and more preferably in a range of up to 2,000 parts by weight. When component (D) is added, its amount is preferably at least 0.1 part by weight, and more preferably at least 1 part by weight.

[Other Components]

The addition curable silicone composition of the invention may contain a conventional well-known platinum group metal catalyst, which does not possess a microcapsule structure, used in addition reaction as long as the benefits of the invention are not compromised. An addition cure reaction inhibitor may not be added to the addition curable silicone composition of the invention. That is, the silicone composition may be free of an addition cure reaction inhibitor. Non-reactive organo(poly)siloxanes such as methylpolysiloxane may be added for adjusting the modulus and viscosity of the composition. In addition, conventional well-known antioxidants such as 2,6-di-tert-butyl-4-methylphenol may be added, if desired, for preventing the addition curable silicone composition from deterioration. Moreover, adhesion promoters, surface treating agents, mold release agents, dyes, pigments, flame retardants, anti-settling agents, thixotropic agents and the like may also be added if desired.

Next, the method for preparing the inventive addition curable silicone composition is described below although the method is not limited thereto.

The method for preparing the inventive addition curable silicone composition is not particularly limited and may accord with the conventional methods for preparing addition curable silicone compositions. For example, the method is by mixing the above-mentioned components (A) to (C) and, optionally component (D) and other components on a mixer such as Thinky Mixer (registered trademark of THINKY Corp.), Trimix, Twinmix, Planetary Mixer (all registered trademarks of mixers by Inoue Mfg., Inc.), Ultramixer (registered trademark of a mixer by Mizuho Industrial Co., Ltd.), or Hivis Disper Mix (registered trademark of a mixer by Tokushu Kika Kogyo K.K.) or by manual mixing with a spatula or the like.

The addition curable silicone composition of the invention has a viscosity of at least 0.1 Pa·s and less than 1,000 Pa·s, preferably 1 to 500 Pa·s, and more preferably 5 to 300 Pa·s as measured at 25° C. If the viscosity is less than 0.1 Pa·s, workability may worsen, typically shape retention become difficult. If the viscosity exceeds 1,000 Pa·s, workability may worsen, typically dispensing and coating become difficult. A viscosity in the range is obtainable by adjusting the relative amounts of components. As used herein, the viscosity is as measured at 25° C. by a spiral viscometer such as a Malcolm viscometer (rotor A, 10 rpm, shear rate 6 $s^{-1}$).

The addition curable silicone composition may be suitably used in a broad range of applications like prior art common addition curable silicone compositions and is especially effective for the purpose of improving the long-term storage stability at room temperature without a need for an addition cure reaction inhibitor.

Although the curing conditions under which the inventive addition curable silicone composition is cured are not particularly limited, typical conditions include a temperature of from 25 to 200° C., preferably from 60 to 180° C., more preferably from 80 to 170° C., and a time of from 3 minutes to 24 hours, preferably from 5 minutes to 12 hours, and more preferably from 10 minutes to 6 hours. While the cured state of the addition curable silicone composition is not particularly limited, the cured composition may be in a gel, low-hardness rubber or high-hardness rubber state.

EXAMPLES

Examples and Comparative Examples are given below for further illustrating the invention although the invention is not limited thereto. Herein, the kinematic viscosity is as measured at 25° C. by an Ubbelohde-Ostwald viscometer.

First, the following components were provided for preparing addition curable silicone compositions within the scope of the invention.

[Component (A)]
A-1: Dimethylpolysiloxane Capped with Dimethylvinylsilyl Groups at Both Ends and Having a Kinematic Viscosity of 590 mm²/s at 25° C.

[Component (B)]
B-1: Organohydrogenpolysiloxane of the Following Formula (1) Having a Kinematic Viscosity of 12 mm²/s at 25° C.

[Chem. 1]

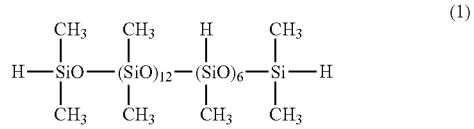

(1)

[Component (C)]
C-1: Microparticulate Hydrosilylation Catalyst Obtained in Synthesis Example 1 Below Synthesis Example 1

Preparation of Component C-1

A 25-mL glass vial was charged with 10.5 g of 1,6-hexanediol dimethacrylate, 4.5 g of a solution of platinum-divinyltetramethyldisiloxane complex in the same dimethylpolysiloxane (kinematic viscosity of 590 mm²/s at 25° C.) as A-1 (platinum atom content: 1 wt % of platinum atom), and 0.105 g of diphenyl(2,4,6-trimethylbenzoyl)phosphine oxide. By vigorous shaking, an oil-in-oil emulsion was prepared. After 135 g of a 2 wt % aqueous solution of polyvinyl alcohol was weighed into a 300-mL polypropylene cup, with stirring by Homo Mixer set at a rotational speed of 1,400 rpm, the O/O emulsion prepared above was added to the aqueous solution. With the rotational speed reset at 3,000 rpm, stirring was continued at room temperature under light-shielded conditions for 1 hour, yielding an (oil-in-oil)-in-water emulsion. The resulting (O/O)/W emulsion was then irradiated with ultraviolet radiation of wavelength 365 nm from an UV-LED lamp for 1 hour. The emulsion was kept stationary under light-shielded conditions for 24 hours, after which the supernatant was decanted off. The precipitate was washed and centrifuged using deionized water, deionized water/ethanol (50/50 weight ratio), ethanol, ethanol/toluene (50/50 weight ratio), and toluene in the described order, and freeze dried for 3 hours, obtaining 8.7 g (yield 58%) of a microparticulate hydrosilylation catalyst of microcapsule structure in white powder form. The platinum atom content was 0.306 wt % as measured by an ICP-OES spectrometer (Agilent 730 by Agilent Technologies), and the average particle size was 14.7 μm as measured by a laser diffraction/scattering particle size analyzer (LA-750 by Horiba, Ltd.).

C-2: Microparticulate Hydrosilylation Catalyst Obtained in Synthesis Example 2 Below Synthesis Example 2

Preparation of Component C-2

A 25-mL glass vial was charged with 10.5 g of glycerol dimethacrylate, 4.5 g of a solution of platinum-divinyltetramethyldisiloxane complex in the same dimethylpolysiloxane (kinematic viscosity of 590 mm²/s at 25° C.) as A-1 (platinum atom content: 1 wt % of platinum atom), and 0.105 g of diphenyl(2,4,6-trimethylbenzoyl)phosphine oxide. By vigorous shaking, an oil-in-oil emulsion was prepared. After 135 g of a 2 wt % aqueous solution of polyvinyl alcohol was weighed into a 300-mL polypropylene cup, with stirring by Homo Mixer set at a rotational speed of 1,400 rpm, the O/O emulsion prepared above was added to the aqueous solution. With the rotational speed reset at 3,000 rpm, stirring was continued at room temperature under light-shielded conditions for 1 hour, yielding an (oil-in-oil)-in-water emulsion. The resulting (O/O)/W emulsion was then irradiated with ultraviolet radiation of wavelength 365 nm from an UV-LED lamp for 1 hour. The emulsion was kept stationary under light-shielded conditions for 24 hours, after which the supernatant was decanted off. The precipitate was washed and centrifuged using deionized water, deionized water/ethanol (50/50 weight ratio), ethanol, ethanol/toluene (50/50 weight ratio), and toluene in the described order, and freeze dried for 3 hours, obtaining 7.0 g (yield 46%) of a microparticulate hydrosilylation catalyst of microcapsule structure in white powder form. The platinum atom content was 0.306 wt % as measured by an ICP-OES spectrometer (Agilent 730 by Agilent Technologies), and the average particle size was 10.7 μm as measured by a laser diffraction/scattering particle size analyzer (LA-750 by Horiba, Ltd.).

C-3: Microparticulate Hydrosilylation Catalyst Obtained in Synthesis Example 3 Below Synthesis Example 3

Preparation of Component C-3

A 25-mL glass vial was charged with 10.5 g of pentaerythritol tetraacrylate, 4.5 g of a solution of platinum-divinyltetramethyldisiloxane complex in the same dimethylpolysiloxane (kinematic viscosity of 590 mm²/s at 25° C.) as A-1 (platinum atom content: 1 wt % of platinum atom), and 0.105 g of diphenyl(2,4,6-trimethylbenzoyl)phosphine oxide. By vigorous shaking, an oil-in-oil emulsion was prepared. After 135 g of a 2 wt % aqueous solution of polyvinyl alcohol was weighed into a 300-mL polypropylene cup, with stirring by Homo Mixer set at a rotational speed of 1,400 rpm, the O/O emulsion prepared above was added to the aqueous solution. With the rotational speed reset at 3,000 rpm, stirring was continued at room temperature under light-shielded conditions for 1 hour, yielding an (oil-in-oil)-in-water emulsion. The resulting (O/O)/W emulsion was then irradiated with ultraviolet radiation of wavelength 365 nm from an UV-LED lamp for 1 hour. The emulsion was kept stationary under light-shielded conditions for 24 hours, after which the supernatant was decanted off. The precipitate was washed and centrifuged using deionized water, deionized water/ethanol (50/50 weight ratio), ethanol, ethanol/toluene (50/50 weight ratio), and toluene in the described order, and freeze dried for 3 hours, obtaining 7.9 g (yield 52%) of a microparticulate hydrosilylation catalyst of microcapsule structure in white powder form. The platinum atom content was 0.293 wt % as measured by an ICP-OES spectrometer (Agilent 730 by Agilent Technologies), and the average particle size was 48.3 μm as measured by a laser diffraction/scattering particle size analyzer (LA-750 by Horiba, Ltd.).

C-4: Microparticulate Hydrosilylation Catalyst Nanoparticle Obtained in Synthesis Example 4 Below Synthesis Example 4

Preparation of Component C-4

A 25-mL glass vial was charged with 10.5 g of di(trimethylolpropane) tetraacrylate, 4.5 g of a solution of platinum-divinyltetramethyldisiloxane complex in the same dimethylpolysiloxane (kinematic viscosity of 590 mm$^2$/s at 25° C.) as A-1 (platinum atom content: 1 wt % of platinum atom), and 0.105 g of diphenyl(2,4,6-trimethylbenzoyl)phosphine oxide. By vigorous shaking, an oil-in-oil emulsion was prepared. After 135 g of a 2 wt % aqueous solution of polyvinyl alcohol was weighed into a 300-mL polypropylene cup, with stirring by Homo Mixer set at a rotational speed 1,400 rpm, the O/O emulsion prepared above was added to the aqueous solution. With the rotational speed reset at 3,000 rpm, stirring was continued at room temperature under light-shielded conditions for 1 hour, yielding an (oil-in-oil)-in-water emulsion. The resulting (O/O)/W emulsion was then irradiated with ultraviolet radiation of wavelength 365 nm from an UV-LED lamp for 1 hour. The emulsion was kept stationary under light-shielded conditions for 24 hours, after which the supernatant was decanted off. The precipitate was washed and centrifuged using deionized water, deionized water/ethanol (50/50 weight ratio), ethanol, ethanol/toluene (50/50 weight ratio), and toluene in the described order, and freeze dried for 3 hours, obtaining 8.3 g (yield 55%) of a microparticulate hydrosilylation catalyst of microcapsule structure in white powder form. The platinum atom content was 0.268 wt % as measured by an ICP-OES spectrometer (Agilent 730 by Agilent Technologies), and the average particle size was 49.7 μm as measured by a laser diffraction/scattering particle size analyzer (LA-750 by Horiba, Ltd.).

C-5: Microparticulate Hydrosilylation Catalyst Obtained in Synthesis Example 5 Below Synthesis Example 5

Preparation of Component C-5

A 25-mL glass vial was charged with 10.5 g of glycerol dimethacrylate, 4.5 g of a solution of platinum-divinyltetramethyldisiloxane complex in a dimethylpolysiloxane (kinematic viscosity of 110 mm$^2$/s at 25° C.) (platinum atom content: 1 wt % of platinum atom), and 0.105 g of diphenyl(2,4,6-trimethylbenzoyl)phosphine oxide. By vigorous shaking, an oil-in-oil emulsion was prepared. After 135 g of a 2 wt % aqueous solution of polyvinyl alcohol was weighed into a 300-mL polypropylene cup, with stirring by Homo Mixer set at a rotational speed of 1,400 rpm, the O/O emulsion prepared above was added to the aqueous solution. With the rotational speed reset at 3,000 rpm, stirring was continued at room temperature under light-shielded conditions for 1 hour, yielding an (oil-in-oil)-in-water emulsion. The resulting (O/O)/W emulsion was then irradiated with ultraviolet radiation of wavelength 365 nm from an UV-LED lamp for 1 hour. The emulsion was kept stationary under light-shielded conditions for 24 hours, after which the supernatant was decanted off. The precipitate was washed and centrifuged using deionized water, deionized water/ethanol (50/50 weight ratio), ethanol, ethanol/toluene (50/50 weight ratio), and toluene in the described order, and freeze dried for 3 hours, obtaining 6.8 g (yield 45%) of a microparticulate hydrosilylation catalyst of microcapsule structure in white powder form. The platinum atom content was 0.310 wt % as measured by an ICP-OES spectrometer (Agilent 730 by Agilent Technologies), and the average particle size was 10.0 μm as measured by a laser diffraction/scattering particle size analyzer (LA-750 by Horiba, Ltd.).

C-6: Microparticulate Hydrosilylation Catalyst Obtained in Synthesis Example 6 Below Synthesis Example 6

Preparation of Component C-6

A 25-mL glass vial was charged with 10.5 g of 1,6-hexanediol dimethacrylate, 4.5 g of a solution of platinum-divinyltetramethyldisiloxane complex in a dimethylpolysiloxane (kinematic viscosity of 96,000 mm$^2$/s at 25° C.) (platinum atom content: 1 wt % of platinum atom), and 0.105 g of diphenyl(2,4,6-trimethylbenzoyl)phosphine oxide. By vigorous shaking, an oil-in-oil emulsion was prepared. After 135 g of a 2 wt % aqueous solution of polyvinyl alcohol was weighed into a 300-mL polypropylene cup, with stirring by Homo Mixer set at a rotational speed of 1,400 rpm, the O/O emulsion prepared above was added to the aqueous solution. With the rotational speed reset at 3,000 rpm, stirring was continued at room temperature under light-shielded conditions for 1 hour, yielding an (oil-in-oil)-in-water emulsion. The resulting (O/O)/W emulsion was then irradiated with ultraviolet radiation of wavelength 365 nm from an UV-LED lamp for 1 hour. The emulsion was kept stationary under light-shielded conditions for 24 hours, after which the supernatant was decanted off. The precipitate was washed and centrifuged using deionized water, deionized water/ethanol (50/50 weight ratio), ethanol, ethanol/toluene (50/50 weight ratio), and toluene in the described order, and freeze dried for 3 hours, obtaining 8.5 g (yield 56%) of a microparticulate hydrosilylation catalyst of microcapsule structure in white powder form. The platinum atom content was 0.309 wt % as measured by an ICP-OES spectrometer (Agilent 730 by Agilent Technologies), and the average particle size was 15.6 μm as measured by a laser diffraction/scattering particle size analyzer (LA-750 by Horiba, Ltd.).

C-7: Microparticulate Hydrosilylation Catalyst Obtained in Synthesis Example 7 (Comparative) Below Synthesis Example 7

Preparation of Component C-7

A 25-mL glass vial was charged with 10.5 g of 1,6-hexanediol dimethacrylate, 15.0 g of a solution of platinum-divinyltetramethyldisiloxane complex in a 30:70 mixture of the same dimethylpolysiloxane as A-1 and toluene (kinematic viscosity of 8.6 mm$^2$/s at 25° C.) (platinum atom content: 0.3 wt % of platinum atom), and 0.105 g of diphenyl(2,4,6-trimethylbenzoyl)phosphine oxide. By vigorous shaking, an oil-in-oil emulsion was prepared. After 135 g of a 2 wt % aqueous solution of polyvinyl alcohol was weighed into a 300-mL polypropylene cup, with stirring by Homo Mixer set at a rotational speed of 1,400 rpm, the O/O emulsion prepared above was added to the aqueous solution.

With the rotational speed reset at 3,000 rpm, stirring was continued at room temperature under light-shielded conditions for 1 hour, yielding an (oil-in-oil)-in-water emulsion. The resulting (O/O)/W emulsion was then irradiated with ultraviolet radiation of wavelength 365 nm from an UV-LED lamp for 1 hour. The emulsion was kept stationary under light-shielded conditions for 24 hours, after which the supernatant was decanted off. The precipitate was washed and centrifuged using deionized water, deionized water/ethanol (50/50 weight ratio), ethanol, ethanol/toluene (50/50 weight ratio), and toluene in the described order, and freeze dried for 3 hours, obtaining 7.6 g (yield 30%) of a microparticulate hydrosilylation catalyst of microcapsule structure in white powder form. The platinum atom content was 0.301 wt % as measured by an ICP-OES spectrometer (Agilent 730 by Agilent Technologies), and the average particle size was 13.0 µm as measured by a laser diffraction/scattering particle size analyzer (LA-750 by Horiba, Ltd.).

C-8: Microparticulate Hydrosilylation Catalyst Obtained in Synthesis Example 8 (Comparative) Below Synthesis Example 8

Preparation of Component C-8

A 25-mL glass vial was charged with 10.5 g of pentaerythritol tetraacrylate, 15.0 g of a solution of platinum-divinyltetramethyldisiloxane complex in a 30:70 mixture of the same dimethylpolysiloxane as A-1 and toluene (kinematic viscosity of 8.6 mm$^2$/s at 25° C.) (platinum atom content: 0.3 wt % of platinum atom), and 0.105 g of diphenyl(2,4,6-trimethylbenzoyl)phosphine oxide. By vigorous shaking, an oil-in-oil emulsion was prepared. After 135 g of a 2 wt % aqueous solution of polyvinyl alcohol was weighed into a 300-mL polypropylene cup, with stirring by Homo Mixer set at a rotational speed of 1,400 rpm, the O/O emulsion prepared above was added to the aqueous solution. With the rotational speed reset at 3,000 rpm, stirring was continued at room temperature under light-shielded conditions for 1 hour, yielding an (oil-in-oil)-in-water emulsion. The (O/O)/W emulsion was then irradiated with ultraviolet radiation of wavelength 365 nm from an UV-LED lamp for 1 hour. The emulsion was kept stationary under light-shielded conditions for 24 hours, after which the supernatant was decanted off. The precipitate was washed and centrifuged using deionized water, deionized water/ethanol (50/50 weight ratio), ethanol, ethanol/toluene (50/50 weight ratio), and toluene in the described order, and freeze dried for 3 hours, obtaining 10.3 g (yield 40%) of a microparticulate hydrosilylation catalyst of microcapsule structure in white powder form. The platinum atom content was 0.299 wt % as measured by an ICP-OES spectrometer (Agilent 730 by Agilent Technologies), and the average particle size was 11.4 µm as measured by a laser diffraction/scattering particle size analyzer (LA-750 by Horiba, Ltd.).

C-9: Microparticulate Hydrosilylation Catalyst Obtained in Synthesis Example 9 (Comparative) Below Synthesis Example 9

Preparation of Component C-9

A 25-mL glass vial was charged with 10.5 g of di(trimethylolpropane) tetraacrylate, 15.0 g of a solution of platinum-divinyltetramethyldisiloxane complex in a 30:70 mixture of the same dimethylpolysiloxane as A-1 and toluene (kinematic viscosity of 8.6 mm$^2$/s at 25° C.) (platinum atom content: 0.3 wt % of platinum atom), and 0.105 g of diphenyl(2,4,6-trimethylbenzoyl)phosphine oxide. By vigorous shaking, an oil-in-oil emulsion was prepared. After 135 g of a 2 wt % aqueous solution of polyvinyl alcohol was weighed into a 300-mL polypropylene cup, with stirring by Homo Mixer set at a rotational speed of 1,400 rpm, the O/O emulsion prepared above was added to the aqueous solution. With the rotational speed reset at 3,000 rpm, stirring was continued at room temperature under light-shielded conditions for 1 hour, yielding an (oil-in-oil)-in-water emulsion. The resulting (O/O)/W emulsion was then irradiated with ultraviolet radiation of wavelength 365 nm from an UV-LED lamp for 1 hour. The emulsion was kept stationary under light-shielded condition for 24 hours, after which the supernatant was decanted off. The precipitate was washed and centrifuged using deionized water, deionized water/ethanol (50/50 weight ratio), ethanol, ethanol/toluene (50/50 weight ratio), and toluene in the described order, and freeze dried for 3 hours, obtaining 10.6 g (yield 42%) of a microparticulate hydrosilylation catalyst of microcapsule structure in white powder form. The platinum atom content was 0.256 wt % as measured by an ICP-OES spectrometer (Agilent 730 by Agilent Technologies), and the average particle size was 14.0 µm as measured by a laser diffraction/scattering particle size analyzer (LA-750 by Horiba, Ltd.).

C-10: Microparticulate Hydrosilylation Catalyst Obtained in Synthesis Example 10 (Comparative) Below Synthesis Example 10

Preparation of Component C-10

A 25-mL glass vial was charged with 10.5 g of 1,6-hexanediol dimethacrylate, 15.0 g of a solution of platinum-divinyltetramethyldisiloxane complex in toluene (kinematic viscosity of 0.68 mm$^2$/s at 25° C.) (platinum atom content: 0.3 wt % of platinum atom), and 0.105 g of diphenyl(2,4,6-trimethylbenzoyl)phosphine oxide. By vigorous shaking, an oil-in-oil emulsion was prepared. After 135 g of a 2 wt % aqueous solution of polyvinyl alcohol was weighed into a 300-mL polypropylene cup, with stirring by Homo Mixer set at a rotational speed of 1,400 rpm, the O/O emulsion prepared above was added to the aqueous solution. With the rotational speed reset at 3,000 rpm, stirring was continued at room temperature under light-shielded conditions for 1 hour, yielding an (oil-in-oil)-in-water emulsion. The resulting (O/O)/W emulsion was then irradiated with ultraviolet radiation of wavelength 365 nm from an UV-LED lamp for 1 hour. The emulsion was kept stationary under light-shielded conditions for 24 hours, after which the supernatant was decanted off. The precipitate was washed and centrifuged using deionized water, deionized water/ethanol (50/50 weight ratio), ethanol, ethanol/toluene (50/50 weight ratio), and toluene in the described order, and freeze dried for 3 hours, obtaining 7.1 g (yield 28%) of a microparticulate hydrosilylation catalyst of microcapsule structure in white powder form. The platinum atom content was 0.295 wt % as measured by an ICP-OES spectrometer (Agilent 730 by Agilent Technologies), and the average particle size was 12.4 µm as measured by a laser diffraction/scattering particle size analyzer (LA-750 by Horiba, Ltd.).

C-11: Microparticulate Hydrosilylation Catalyst Obtained in Synthesis Example 11 (Comparative) Below Synthesis Example 11

Preparation of Component C-11

A 25-mL glass vial was charged with 10.5 g of 1,6-hexanediol dimethacrylate, 4.5 g of a solution of platinum-divinyltetramethyldisiloxane complex in a dimethylpolysiloxane (kinematic viscosity of 205,000 mm$^2$/s at 25° C.) (platinum atom content: 0.3 wt % of platinum atom), and 0.105 g of diphenyl(2,4,6-trimethylbenzoyl)phosphine oxide. By vigorous shaking, an oil-in-oil emulsion was prepared. After 135 g of a 2 wt % aqueous solution of polyvinyl alcohol was weighed into a 300-mL polypropylene cup, with stirring by Homo Mixer set at a rotational speed of 1,400 rpm, the O/O emulsion prepared above was added to the aqueous solution. With the rotational speed reset at 3,000 rpm, stirring was continued at room temperature under light-shielded conditions for 1 hour, yielding an (oil-in-oil)-in-water emulsion. The resulting (O/O)/W emulsion was then irradiated with ultraviolet radiation of wavelength 365 nm from an UV-LED lamp for 1 hour. The emulsion was kept stationary under light-shielded conditions for 24 hours, after which the supernatant was decanted off. The precipitate was washed and centrifuged using deionized water, deionized water/ethanol (50/50 weight ratio), ethanol, ethanol/toluene (50/50 weight ratio), and toluene in the described order, and freeze dried for 3 hours, obtaining 7.2 g (yield 48%) of a microparticulate hydrosilylation catalyst of microcapsule structure in white powder form. The platinum atom content was 0.295 wt % as measured by an ICP-OES spectrometer (Agilent 730 by Agilent Technologies), and the average particle size was 16.1 μm as measured by a laser diffraction/scattering particle size analyzer (LA-750 by Horiba, Ltd.).

C-12: A Solution of Platinum-Divinyltetramethyldisiloxane Complex in the Same Dimethylpolysiloxane as A-1 (Platinum Atom Content: 1 wt % of Platinum Atom)

[Component (D)]
D-1: Hydrophobic Fumed Silica (BET Specific Surface Area 110 m²/g)

Other Components
[Component (E)]
E-1: Addition Cure Reaction Inhibitor of the Following Formula (2)

[Chem. 2]

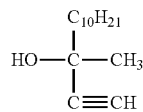

(2)

Examples 1 to 6 and Comparative Examples 1 to 7

Preparation of Addition Curable Silicone Compositions

Addition curable silicone compositions were prepared by mixing the foregoing components (A) to (E) in the amounts shown in Tables 1 and 2 according to the following procedure. As used herein, Si—H/Si-Vi (number ratio) is a ratio of the total number of Si—H groups in component (B) to the total number of alkenyl (specifically vinyl) groups in component (A).

An addition curable silicone composition was prepared by charging a plastic container with components (A) and (D), and mixing them using Thinky Mixer (THINKY Corp.) at 2,000 rpm for 90 seconds. Next, component (C) was added thereto and mixed at 2,000 rpm for 30 seconds. Further, component (B) was added thereto and mixed at 2,000 rpm for 30 seconds. Where component (E) was blended, it was added and mixed at 2,000 rpm for 30 seconds before the blending of component (C).

Each of the compositions prepared by the above procedure was measured for initial absolute viscosity at 25° C. by a Malcolm viscometer (type PC-1T) and evaluated for room-temperature storage stability and heat curing by the following methods. The results are also shown in Tables 1 and 2.

[Room-Temperature Storage Stability Test]

The addition curable silicone composition prepared above was stored in a plastic container under a 25° C. environment, and monitored to determine the time passed until the composition cured. As used herein, "cured" is defined as the state that the absolute viscosity of the composition exceeds 1,000 Pa·s as measured at 25° C. using a Malcolm viscometer (type PC-1T).

[Heat Curing Test]

An uncured addition curable silicone composition was applied to a thickness of 2 mm between two parallel disks of diameter 2.5 cm. The coated disks was heated from 25° C. to 125° C. at 10° C./min, from 125° C. to 145° C. at 2° C./min, and from 145° C. to 150° C. at 0.5° C./min, after which the temperature was kept at 150° C. until the storage modulus G' of the addition curable silicone composition was saturated. The time t90 passed until the storage modulus G' reached 90% of the saturation value was read. A smaller value of t90 indicates a faster cure speed, differently stated, the silicone composition is judged to be superior in heat curing performance. For the measurement of storage modulus, a viscoelasticity measuring apparatus (type RDA III by Rheometric Scientific Far East Ltd.) was used.

TABLE 1

| | | Example | | | | | |
|---|---|---|---|---|---|---|---|
| | | 1 | 2 | 3 | 4 | 5 | 6 |
| Formulation (pbw) | A-1 | 100 | 100 | 100 | 100 | 100 | 100 |
| | B-1 | 4.1 | 4.1 | 4.1 | 4.1 | 4.1 | 4.1 |
| | C-1 | 0.2 | | | | | |
| | C-2 | | 0.2 | | | | |
| | C-3 | | | 0.2 | | | |
| | C-4 | | | | 0.2 | | |
| | C-5 | | | | | 0.2 | |
| | C-6 | | | | | | 0.2 |
| | D-1 | 15 | 15 | 15 | 15 | 15 | 15 |
| | Si—H/Si-Vi (number ratio) | 1.5 | 1.5 | 1.5 | 1.5 | 1.5 | 1.5 |
| | Initial viscosity (Pa·s) | 6 | 6 | 7 | 7 | 6 | 7 |
| Evaluation results | RT storage stability (time until cured, days) | 18 | >30 | 27 | >30 | 23 | >30 |
| | Heat curing (t90, sec) | 1,096 | 1,141 | 1,177 | 1,205 | 1,080 | 1,372 |

TABLE 2

| | | Comparative Example | | | | | | |
|---|---|---|---|---|---|---|---|---|
| | | 1 | 2 | 3 | 4 | 5 | 6 | 7 |
| Formulation (pbw) | A-1 | 100 | 100 | 100 | 100 | 100 | 100 | 100 |
| | B-1 | 4.1 | 4.1 | 4.1 | 4.1 | 4.1 | 4.1 | 4.1 |
| | C-7 | 0.2 | | | | | | |
| | C-8 | | 0.2 | | | | | |
| | C-9 | | | 0.2 | | | | |
| | C-10 | | | | 0.2 | | | |
| | C-11 | | | | | 0.2 | | |
| | C-12 | | | | | | 0.07 | 0.07 |
| | D-1 | 15 | 15 | 15 | 15 | 15 | 15 | 15 |
| | E-1 | | | | | | | 0.25 |
| | Si—H/Si-Vi (number ratio) | 1.5 | 1.5 | 1.5 | 1.5 | 1.5 | 1.5 | 1.5 |
| | Initial viscosity (Pa · s) | 7 | 6 | 6 | 6 | 6 | 7 | 7 |
| Evaluation results | RT storage stability (time until cured, days) | <1 | <1 | 2 | <1 | >30 | * | >30 |
| | Heat curing (t90, sec) | 967 | 1,008 | 1,074 | 950 | ** | — | 3,504 |

\* Cured immediately after component (B) was added and mixed
\*\* Partially cured non-uniform product As seen from the results of Tables 1 and 2, the compositions of Examples 1 to 6 which satisfy the requirements of the invention took an extremely long time until cured during storage at room temperature. They also had small values of t90, which indicate a fast cure speed, or in other words, the silicone compositions showed excellent heat curing performance. Accordingly, the compositions meet both "excellent long-term storage stability at room temperature" and "rapid curing on heating."

On the other hand, the compositions of Comparative Examples 1 to 4 cured in a very short time when stored at room temperature. In other words, the compositions are judged to have poor long-term storage stability at room temperature. Although the composition of Comparative Example 5 had good long-term storage stability at room temperature, it turned to a partially cured non-uniform product when heat cured. The composition of Comparative Example 6 cured immediately after component (B) was added and mixed, which indicates that the composition lacks storage stability at room temperature. Although the composition of Comparative Example 7 having the addition cure reaction inhibitor added thereto had good long-term storage stability at room temperature, a substantial value of t90 indicated that the composition had poor heat curing performance.

It is thus demonstrated that the addition curable silicone composition of the invention, which takes advantage of a microparticulate hydrosilylation catalyst of specific microcapsule structure, meets excellent long-term storage stability at room temperature even in the absence of an addition cure reaction inhibitor and maintains rapid heat curing performance.

The invention is not limited to the foregoing embodiments. The embodiments are for illustrative purpose only, and any embodiment which has substantially the same constitution as the technical idea set forth in the claims and which exerts equivalent actions and effects falls within the spirit and scope of the invention.

The invention claimed is:

1. An addition curable silicone composition comprising:
   (A) an organopolysiloxane containing at least two aliphatic unsaturated hydrocarbon groups per molecule and having a kinematic viscosity of 60 to 100,000 mm$^2$/s at 25° C.,
   (B) an organohydrogenpolysiloxane having at least two silicon-bonded hydrogen atoms per molecule, in such an amount that a ratio of the number of Si—H groups to the total number of aliphatic unsaturated hydrocarbon groups in component (A) ranges from 0.5 to 5, and
   (C) an effective amount of a microparticulate hydrosilylation catalyst of microcapsule structure consisting of a core material of an organic compound or polymer containing a platinum group metal catalyst and a shell material of a three-dimensional crosslinked polymer obtained by polymerizing at least one polyfunctional monomer, the organic compound or polymer containing a platinum group metal catalyst having a kinematic viscosity of 10 to 100,000 mm$^2$/s at 25° C.,
   wherein the polyfunctional monomer is a polyfunctional monomer having at least two polymerizable carbon-carbon double bonds per molecule.

2. The addition curable silicone composition of claim 1 wherein component (C) has an average particle size of 0.01 to 1,000 μm.

3. The addition curable silicone composition of claim 1 wherein the polyfunctional monomer is a polyfunctional monomer having at least two (meth)acrylic groups per molecule.

4. The addition curable silicone composition of claim 1, further comprising (D) at least one inorganic filler selected from the group consisting of metals, metal oxides, metal hydroxides, metal nitrides, metal carbides, and carbon allotropes, in an amount of 0.1 to 5,000 parts by weight per 100 parts by weight of component (A).

\* \* \* \* \*